(12) United States Patent
Nguyen

(10) Patent No.: US 6,317,842 B1
(45) Date of Patent: Nov. 13, 2001

(54) METHOD AND CIRCUIT FOR RECEIVING DUAL EDGE CLOCKED DATA

(75) Inventor: Kha Nguyen, Anaheim, CA (US)

(73) Assignee: QLogic Corporation, Aliso Viejo, CA (US)

(*) Notice: Subject to any disclaimer, the term of this patent is extended or adjusted under 35 U.S.C. 154(b) by 0 days.

(21) Appl. No.: 09/249,873

(22) Filed: Feb. 16, 1999

(51) Int. Cl.⁷ ............................ G06F 1/12; G06F 1/04
(52) U.S. Cl. .................................... 713/400; 713/500
(58) Field of Search ............................ 713/400, 500, 713/600, 501, 502

(56) References Cited

U.S. PATENT DOCUMENTS

| | | |
|---|---|---|
| 3,988,716 | 10/1976 | Fletcher et al. . |
| 4,050,097 | 9/1977 | Miu et al. . |
| 4,275,457 | 6/1981 | Leighou et al. . |
| 4,451,898 | 5/1984 | Palermo et al. . |
| 4,486,750 | 12/1984 | Aoki . |
| 4,625,321 * | 11/1986 | Pechar et al. ................ 375/116 |
| 4,811,282 * | 3/1989 | Masina ........................ 364/900 |
| 4,812,769 | 3/1989 | Agoston . |
| 4,970,418 * | 11/1990 | Masterson .................... 327/141 |
| 5,261,081 * | 11/1993 | White et al. .................. 713/600 |
| 5,276,807 | 1/1994 | Kodama et al. . |
| 5,440,751 | 8/1995 | Santeler et al. . |
| 5,692,165 * | 11/1997 | Jeddeloh et al. .............. 395/551 |
| 5,719,516 * | 2/1998 | Sharpe-Geisler ............. 327/291 |
| 5,745,793 * | 4/1998 | Atsatt et al. ................. 395/881 |
| 5,758,188 | 5/1998 | Appelbaum et al. . |
| 5,801,998 | 9/1998 | Choi . |
| 5,818,886 * | 10/1998 | Castle ......................... 375/354 |
| 5,831,922 | 11/1998 | Choi . |
| 5,844,844 * | 12/1998 | Bauer et al. ............... 365/189.05 |
| 5,850,422 | 12/1998 | Chen . |
| 5,854,918 * | 12/1998 | Baxter ......................... 713/500 |
| 5,925,135 * | 7/1999 | Trieu et al. ................... 713/400 |
| 5,950,223 * | 6/1999 | Chiang et al. ................ 711/105 |
| 5,968,180 * | 10/1999 | Baco ........................... 713/400 |
| 6,029,250 * | 2/2000 | Keeth .......................... 713/400 |
| 6,041,417 * | 6/1998 | Hammond et al. ............ 713/400 |

OTHER PUBLICATIONS

Hwang, Kai and Briggs, Faye A., "Computer Architecture and Parallel Processing," pp. 156–164 (undated).

Zeidman, Bob, "Interleaving DRAMS for Faster Access," System Design ASIC & EDA, pp. 24–34 (Nov. 1993).

* cited by examiner

*Primary Examiner*—William Grant
*Assistant Examiner*—Ronald D Hartman, Jr.
(74) *Attorney, Agent, or Firm*—Knobbe, Martens, Olson & Bear, LLP

(57) ABSTRACT

A method and circuit for receiving data that is provided on both edges of a strobe signal. The circuit provides the data to an output while detecting the data and generating the appropriate control signals. The circuit incorporates three data rates, one rate for data from the data bus, another slower rate for data transfers within the circuit, and another faster rate for data transfers out of the circuit. The circuit employs the same clock rate used for receiving data on a single edge of a strobe signal by dividing the task of detecting the edges and generating control pulses between two pulse generation units.

13 Claims, 5 Drawing Sheets

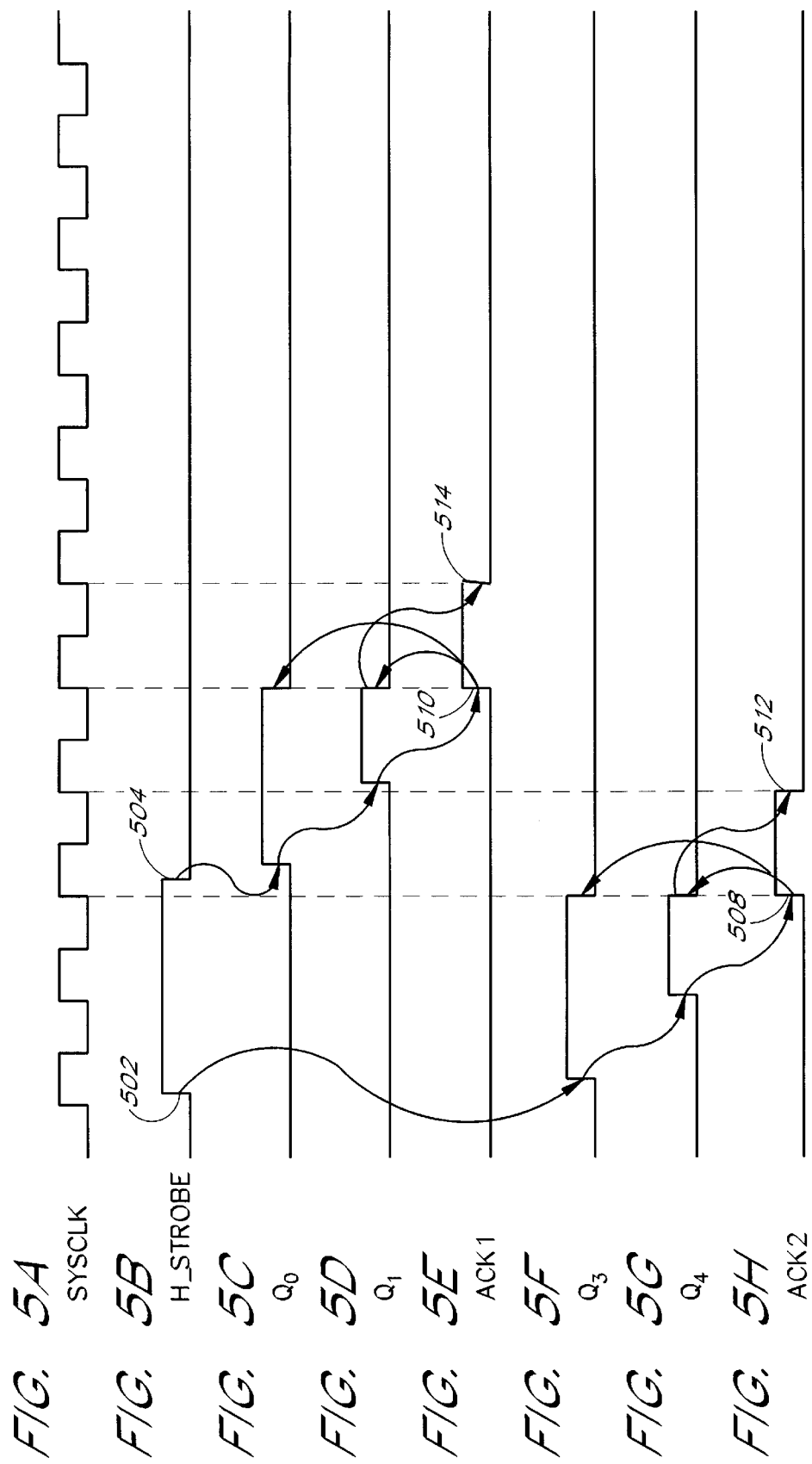

METHOD AND CIRCUIT FOR RECEIVING DUAL EDGE CLOCKED DATA

BACKGROUND OF THE INVENTION

1. Field of the Invention

The present invention relates generally to improvements to computer systems and, more particularly but not by way of limitation, to apparatus for receiving data on both edges of a control signal.

2. Description of the Related Art

Computer systems commonly include one or more peripheral storage devices that are used to store and/or provide access to data. One common type of peripheral storage device is a hard disk drive. Other types of peripheral storage devices include tape drives, CD drives (both read-only and read/write), and DVD devices.

The most basic parts of a hard disk drive include at least one platter or "disk" that is rotated, an actuator that moves a transducer to various locations over the disk, and electrical circuitry that is used to write and read data to and from the disk. The disk drive also includes circuitry for encoding data so that data can be successfully retrieved from and written to the disk surface. The circuitry for encoding the data and circuitry that is used to perform the read and write operations on the disk are usually in a controller. The controller can be made as an integrated circuit placed within the hard disk drive. A disk drive microprocessor ("microprocessor") can be either embedded within or external to the controller integrated circuit.

The microprocessor controls most of the operations of the disk drive by configuring and monitoring the operation of the controller. For example, a host computer can initiate an operation by sending the controller a read command. The microprocessor recognizes the command and sets up registers in the controller to perform the read operation. The data is then read from the disk into a buffer. When a minimum amount of data is in the buffer the microprocessor sets up the controller to send the data from the buffer to the host.

The process of transferring data from a host to a hard disk typically involves two steps. First, the data is moved from a bus, connected to the host, to a data buffer within or coupled to the disc controller. Second, the data is transferred from the buffer and to the disk platter by magnetizing areas of the platter. The first step is generally referred to as the "external data transfer." The simplest buffer is just an array of memory cells within the controller. A buffer may also be an external Dynamic Random Access Memory (DRAM) external to the controller. The hard disk controller facilitates this transfer of data from a host bus to the buffer by using a buffer controller. The buffer controller includes logic to transfer data to and from the buffer. The separation between transfers from the host to the buffer and from the buffer to the platter is used to accommodate the fact that a sector is usually written or read as a single unit. In this manner the buffer is used to provide two data rates, one for data transfers from the system bus to the buffer, and the other for data transfers from the buffer to the physical platter.

The host system usually includes a host microprocessor used to control the operations of the host system. The host unit would typically include a peripheral device adapter such as an IDE disk controller to facilitate the interface between the host system and a storage device. The host system also includes memory used by the host during operation.

The external data transfer can be accomplished either as a synchronous or asynchronous transfer. Digital circuits in an electronic system are typically controlled by a common clock signal or by a plurality of clock signals derived from a common clock signal. Thus, the circuits are "synchronized" with respect to each other so that a signal generated by a first circuit in the system can be received by and clocked into other circuits in the system because the signals generated by the first circuit have a known phase relationship with respect to the common system clock signals. The known phase relationships typically do not exist for circuits that are controlled by independent clock signals. For example, peripheral components of a computer system often use independent clocks so that the peripheral component operates at a known frequency irrespective of the operating frequency of the computer system to which it is interconnected. Although the clock signals of a peripheral component and a computer system may have the same or similar frequencies, even very small differences in the clock frequencies cause the phase relationships between the clock signals to vary. Thus, the independent clock signals are "asynchronous" with respect to each other. Therefore, if a signal is generated by a circuit controlled by a clock which is asynchronous with the system clock, the signal cannot be simply provided to the circuits of the computer system and clocked by the clock signals derived from the system clock. Rather, the signal must be synchronized to the system clock before the signal can be applied to the circuits of the computer system. A synchronization would be accomplished by providing the same asynchronous signal received to the circuit output at a phase and rate used by a local clock. Thus, an asynchronous transfer of data as opposed to a synchronous transfer, involves the additional step of synchronizing the data phase to that used by the receiver. Therefore, a receiving unit in an asynchronous transfer mode has to provide two functions, one of data detection, and the other of a data synchronization. The synchronization of the data transferred is usually accomplished by sending asynchronous control signals along with the data to indicate the presence of valid data on a bus.

The ATA (AT-Attachment) or IDE interface is an example of a protocol that employs asynchronous data transfers. The ATA interface was originally defined as a standard for embedded fixed disk storage on IBM ATT™ compatible personal computers. "AT" stands for advanced technology which referred to the revolutionary, at the time, 16-bit bus used in the ATT™ computer. A DMA (Direct Memory Access) transfer is an example of an asynchronous data transfer within the ATA interface. For example, a DMA write operation would commence with the host writing an address to an ATA target register of the controller to specify the Logical Block Address (LBA) of the disk drive location where data is to be stored. The host then writes a command to a command register used by the controller to specify the operation to be performed. For example, a write operation command may be a "write DMA" command that is written to the command register. The microprocessor then sets up registers in the controller according to a firmware program stored on a ROM. The firmware includes the procedures followed by the microprocessor when processing commands in the command register. The procedure can vary depending on the transfer protocol used.

Once the host sets up the registers, the controller is ready to receive or provide data. For example, during a DMA write operation, the host bus controller sends data over by placing data on the data bus and asserting strobe signals that correspond to the data placed. The controller will detect the strobe signals asserted and receive data from the bus, one segment of data for every strobe detected. The controller also synchronizes the data to the controller clock. In this manner the host can send over as much data it wishes without regard to the clock phase of the target as long as each piece of data is accompanied by a strobe signal that complies with the bus specifications.

The rate of data transfer from the bus is governed by the bus specification, which defines required pulse widths and rates for the specific interface employed. The ATA-1 standard requires a minimum cycle time of 480 ns for the write operation. Therefore, when using an ATA-1 bus which is 16 bit wide, a controller can receive data at a maximum rate of once every 480 ns or 4.1 MB/sec. The ATA-2 and the ATA-3 standards require a minimum cycle time of 120 ns which places a limit of 16.66 MB/sec on the data transfer rate. The standard can be enhanced as to increase the data transfer rate by reducing the minimum cycle time if termination devices and new cabling, such as PCI adapters, are used. However, the different cabling and termination devices are expensive and not easily installed in existing systems.

A new standard was adopted that is known as the Ultra ATA or Ultra DMA protocol. The new Ultra DMA protocol doubles the previous burst transfer rate of 16.6 MB per second to 33 MB per second by allowing data to be sent during both edges of the strobe signal. In this manner twice as much data is transferred per strobe cycle without changing the frequency of the strobe signal, and without the need for termination devices or different cabling.

To support the Ultra DMA protocol, hard disk controllers need to be able to receive data sent by the host on both edges of the strobe signal. ATA processors, for pre-Ultra DMA versions of the ATA standard, are configured to receive data on a single edge of the strobe signal. The clock rate for the controllers is set to enable the receiving of data on a single edge of a strobe, not both edges. Therefore, controllers have to employ faster clock rates to keep up with the faster stream of data coming in. The data from the bus has to be clocked-in fast enough before it is no longer valid. The circuit and method of the present invention offers an efficient and reliable method of receiving dual edge clocked data without the need for a faster controller clock rate.

SUMMARY OF THE INVENTION

The present invention provides a circuit for receiving data sent asynchronously on both edges of a control signal. The circuit may be used, for example, in an Ultra DMA controller, or in another type of device which receives data according to a dual-edge-clocked asynchronous transfer scheme. An important benefit of the circuit is that it allows the dual edge clocked data to be received using substantially the same controller clock frequency that would be used if the data were only transferred on a single edge. Thus, for example, the circuit allows an Ultra DMA controller to be implemented using the 6.66 MHZ controller clock rate commonly used within ATA-3 controllers.

The circuit includes a strobe generator that generates strobes in response to the edges of the control signal accompanying the data. The data from the bus is provided to two temporary storage units. Data corresponding to a first edge of the control signal is placed in a first temporary storage unit. Data corresponding to a second edge of the control signal is placed in a second temporary storage unit. The data is then synchronously provided to an output by using the strobes generated by the strobe generator to select either temporary storage unit to pass data from.

The strobe generator provides pulses in response to both edges of a control signal while using the same clock rate used for providing pulses in response to a single edge of the same control signal. The strobe generator is able to use a slower clock rate than that needed by a single unit pulse generator by dividing the tasks of generating pulses between two sets of components. One set is used to generate pulses for a first edge, and the other is used to generate pulses for a second edge.

Additionally, the present invention provides a method of receiving data from a bus, the data being placed on the bus on both the rising and falling edges of a control signal. The method includes generating a synchronous pulse (synchronized to the controller clock) in response to each transition of the control signal and passing the data to temporary storage units such that all data received along with a first edge of the control signal is passed to a first unit and all data received along with a second edge of the control signal is passed to a second unit. The data is then provided in synchronism with the controller clock to an output of the receiving circuit by using the synchronized pulses to alternate between a selection of data from the two temporary storage units.

The synchronous pulse generator can be constructed from a pair of pulse generating units connected to the control line. One of the pulse generation units has its input port inverted. The pulse generating units can include three latches. The first latch used to detect the edge of the control signal. The second latch used to store the response of the first latch to the edge for a period of one clock cycle. The third latch used to pass the state of the second latch to an output, and reset the circuit for one clock cycle such that the resulting pulse is one clock cycle wide. The system clock is connected to the second and third latches such that the resulting pulse is synchronized with the system clock. Thereby the receiving circuit is used to receive asynchronous data from a dual-edge-clocked bus and to provide the data synchronously to a controller data buffer.

BRIEF DESCRIPTION OF THE DRAWINGS

The foregoing features and other features of the present invention will now be described with reference to the drawings of a preferred embodiment of a disk drive. In the drawings, the same components have the same reference numerals. The illustrated embodiment is intended to illustrate, but not to limit the invention. The drawings include the following figures:

FIG. 5, which consists of FIGS. 5A–5H, is a timing diagram which illustrates the operation of the strobe generator of FIG. 4.

DETAILED DESCRIPTION OF THE PREFERRED EMBODIMENT

Figure 1:
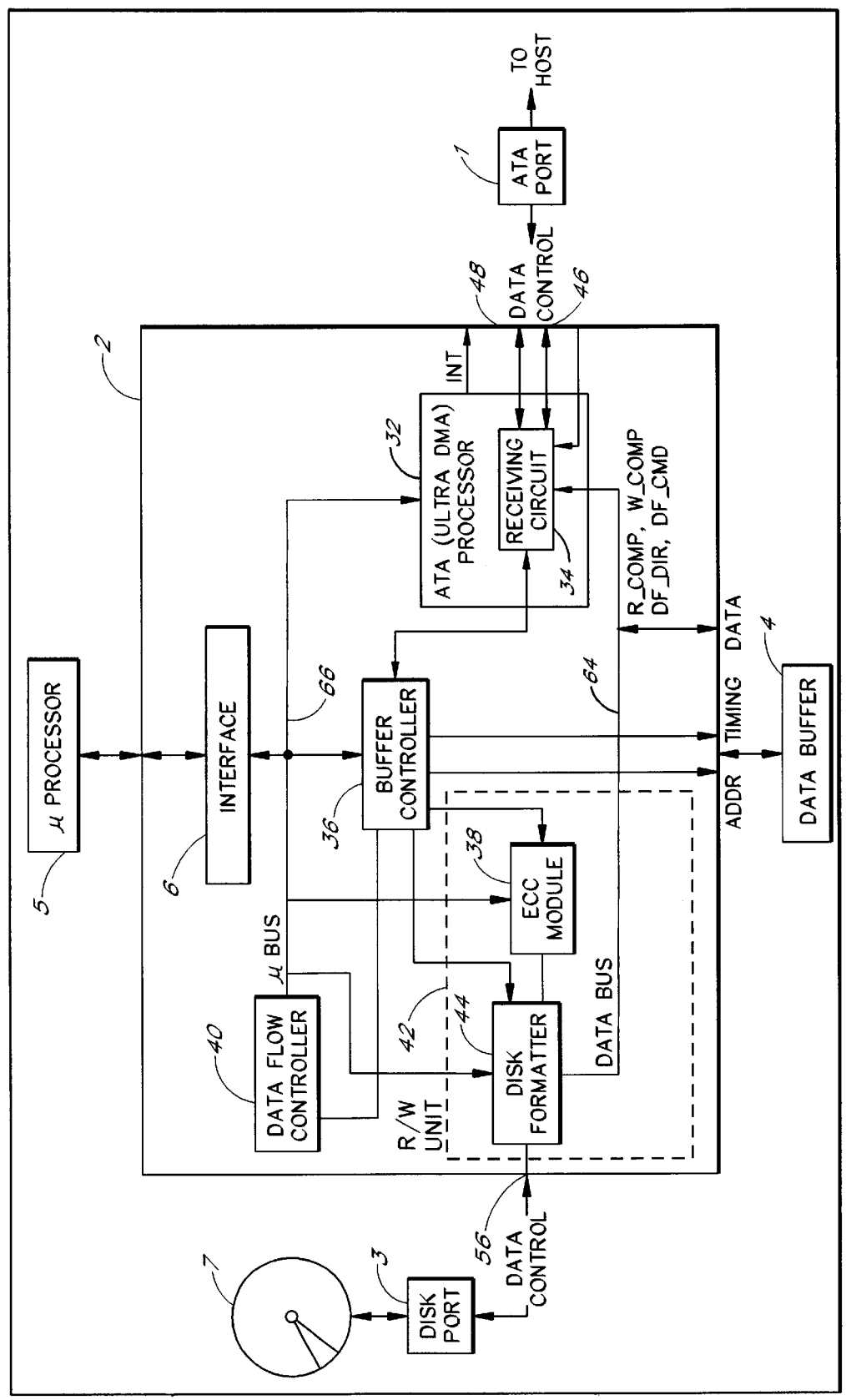
FIG. 1 is a block diagram of a disk drive which embodies the present invention.

To facilitate an understanding of the preferred embodiment, the general architecture and operation of a disk drive will be described first. The specific architecture and operation of the preferred embodiment will then be described with reference to the general architecture and operation of a disk drive. The disk drive of FIG. 1 is an example of an internal (hard) disk drive included in a computer system. The host computer and the disk drive communicate and transfer data via a port 1, which is connected to a data bus (not shown). In an alternate embodiment (not shown), the disk drive is an external disk drive which is connected to a computer via a data bus. In either case, the data bus is a bus in accordance with an Ultra DMA-ATA Interface specification. Those skilled in the art will appreciate that other dual-edge-clocked transfer protocols could be used, including but not limited to the Ultra DMA 66 and SCSI protocols, to transfer data between the disk drive and the computer.

As depicted in FIG. 1, the disk drive includes a controller 2 which is coupled to an ATA port 1, a disk port 3, a data buffer 4, and a microprocessor 5. The interface 6 serves to connect the microprocessor bus 66 to the microprocessor 5, for example, an INTEL 80186 or 80188 microprocessor. A ROM which is used to store firmware code executed by the microprocessor is omitted from the drawing. The disk port 3 couples the controller 2 to one or more platters 7, referred to collectively herein as the "disk." The hard disk controller is using dedicated clock generator to provide a controller clock signal on a clock line (controller clock line) such that the various signals generated by the components are synchronized.

As is standard in the industry, data is stored on the disk 7 in sectors. Each sector is byte structured and is made up of several fields, referred to as the sector format. For example, a typical sector format includes a logical block address (LBA) of about four bytes followed by a data field of about 512 bytes. The LBA contains position information, for example, cylinder, head and sector numbers. The data field is typically followed by a field for a cyclic redundancy code (CRC) checksum of about 2–4 bytes. A subsequent field for a number of error correction code (ECC) bytes, for example 24–40 bytes, is located at the end of the sector.

The controller 2 can be a controller integrated circuit (IC) that comprises several functional modules which provide for the writing and reading of disk data. The controller 2 is connected to the ATA port 1 for a connection to the ATA bus, and is connected to the disk port 3 for a connection to the disk 7. The microprocessor 5 is coupled to the controller 2 via an interface 6 to facilitate the transfer of data, address, timing, and control information. The data buffer 4 is coupled to the controller 2 via ports to facilitate the transfer of data, timing, and address information. The interface 6 is connected to the microprocessor bus 66 to which several modules are connected. A data flow controller 40 is connected to the microprocessor bus 66 and to the buffer controller 36. An ECC module 38 and a disk formatter 44 are both connected to the microprocessor bus 66 and to the buffer controller 36. The disk formatter 44 is additionally connected to a data and control port 56 and to the data bus 64. The ATA processor 32 is connected to the microprocessor bus 66. The ATA processor 32 is further connected to the buffer controller 36 and to the data bus 64. The ATA processor 32 receives data and control signals from ports 48 and 46, respectively.

The ATA processor 32 consists primarily of programmable registers and state machine sequencers that interface to the ATA port 26 on one side and to a fast, buffered direct memory access (DMA) channel on the other side. The ATA processor 32 also includes a receiving circuit 34 to receive ATA bus data that is sent on both edges of the Host Strobe (H-STROBE) signal. The receiving circuit 34 is connected to the buffer controller 36, the data bus 64, and the ATA data port 48. In the preferred embodiment described herein, the ATA processor 32 implements the Ultra DMA protocol.

The disk formatter 44 is a disk interface controller. The disk read/write unit 42 includes the disk formatter 44, a data memory (not shown), the ECC module 38 and a writable control store (WCS) state machine (not shown). The disk formatter 44 primarily performs control operations when the microprocessor 5 loads all required control information and parameter values into a WCS RAM and issues a command. The disk formatter 44 can automatically execute the command with no further intervention from the microprocessor 5.

The buffer controller 36 can be a four-channel, high-speed DMA controller. The buffer controller 36 regulates all data transfers into and out of the data buffer 4. The buffer controller 36 connects the data buffer 4, i.e., an output of its extended data out (EDO) DRAM, to a disk channel (disk formatter 44), to an ECC channel (ECC module 38), to an ATA channel (ATA processor 32), and to the microcontroller bus 66.

Within the buffer controller 36, the DMA controller (not shown) controls several DMA channels. Each DMA channel has associated control, configuration and buffer memory address registers. Communications with the disk and the ATA bus occurs via disk channels and ATA channels each having a 32-word deep first-in-first-out (FIFO) memory. The buffer controller 36 also provides priority arbitration for buffer resources, buffer cyclical redundancy check (BCRC), and automatic refresh control for the DRAM.

The data flow controller 40 serves to reduce data transfer time between the disk 7 and the controller 2 by automatically monitoring and controlling the flow of data between the disk and the ATA channels. This control is accomplished by reducing the number of interrupts that occur in a typical disk-to-ATA bus data transfer. When the disk and the ATA bus data transfer rates are the same, both channels transfer data at the maximum rate which prevents slipped sectors in the disk port 3 and periods of inactivity during a data phase of an ATA bus transfer.

The data flow controller 40 automatically prevents an overflow of the buffer 4, as well as an underflow of the buffer 4, by temporarily suspending the disk formatter 44 or the ATA processor 32 before the buffer 4 becomes full or empty.

Figure 2:
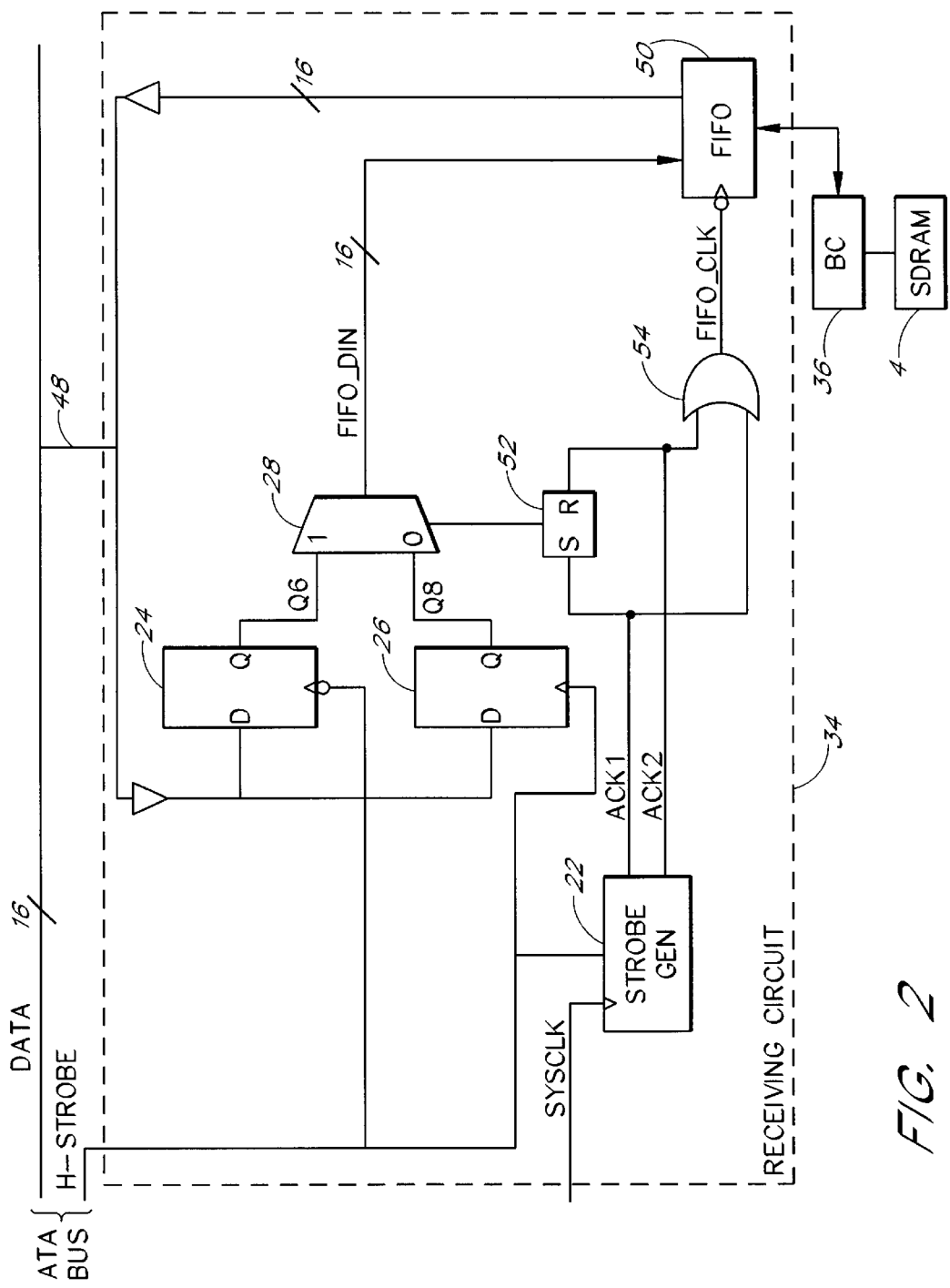
FIG. 2 is a block diagram of the receiving circuit included in the disk controller of FIG. 1.

FIG. 2 illustrates the internal construction of the receiving circuit 34. The receiving circuit includes a strobe generator 22 having an input connected to the controller clock line, an input connected to the H_STROBE signal line, and a pair of output signal lines for the ACK1 and ACK2 signals. A pair of registers, for example 16 bit registers, are included to receive the data from the ATA port 1. A first flip-flop 24 has a data input connected to the data bus 48 of the ATA port 1, a falling-edge triggered clock input connected to the H_STROBE signal line, and an output connected to an input of a multiplexer 28. A second flip-flop 24 has a data input connected to the data bus 48 of the ATA port 1, a rising edge triggered clock input connected to the H_STROBE signal line, and an output connected to an input of the multiplexer 28. The multiplexer 28 has an output connected to the data input of a FIFO memory 50, and a select line connected to the output of a SET-RESET latch (S-R latch) 52. The S-R latch 52 has a set input connected to the ACK1 signal line from the strobe generator 22, a reset input connected to the ACK2 signal line from the strobe generator 22, and an output connected to the select line of the multiplexer 28. The FIFO has a data out port connected to the ATA data bus 48, a data port connected to the buffer controller 36, and a clock input (FIFO__CLK) responsive to a falling edge of a signal from an OR gate 54. The OR gate 54 has a first input connected to the ACK1 signal line, a second input connected to the ACK2 signal line.

Figure 3:
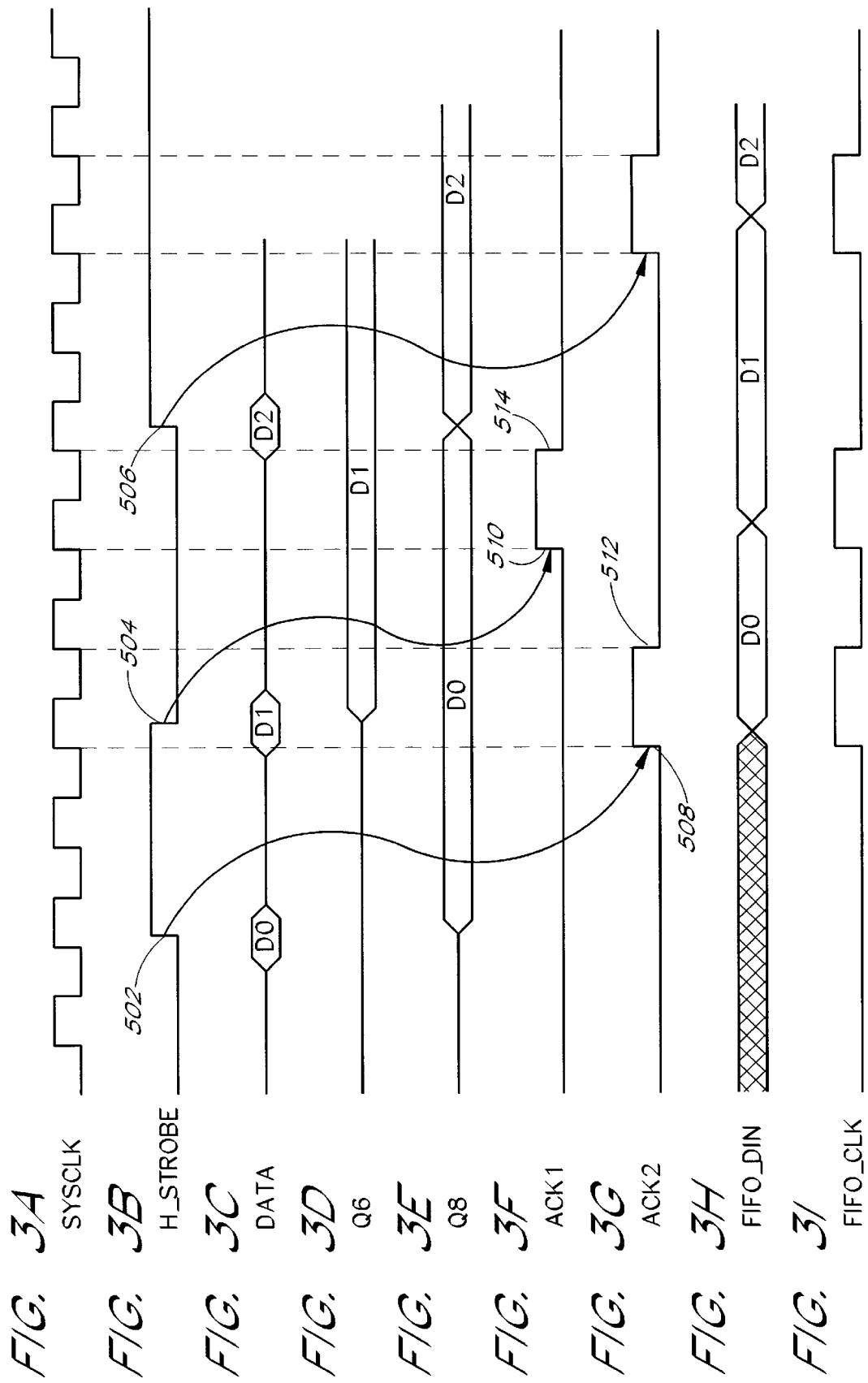
FIG. 3, which consists of FIGS. 3A–3I, is a timing diagram which illustrates the operation of the receiving circuit of FIG. 2.

The operation of the circuit of FIG. 2 can be more easily understood with reference to the signal level illustrations of FIG. 3. The signal illustrations of FIG. 3 represent the various signal levels when data is received by the receiving circuit. When the host sends data to the controller using an Ultra-DMA protocol, the data is valid on the data bus on both rising and falling edges of the H__STROBE signal generated by the host, as can be seen from FIGS. 3B and 3C. The H__STROBE signal can transition at any time relative to the local clock. The strobe generator 22 (discussed below) detects the rising edge 502 of the H__STROBE signal and generates a pulse on the ACK2 signal line as illustrated in FIG. 3G. The data D0 is clocked into flip-flop 26 by the rising edge of the H__STROBE signal as shown in FIG. 3E. The ACK2 signal line pulse is also provided to the reset input of the S-R latch 52 which causes the output of the latch to go to a logical low or 0. The low level output of the S-R latch 52 selects the 0 input of the multiplexer to pass the contents of the register 26 to the output FIFO__DIN bus as shown in FIG. 3H. At the same time, the ACK2 signal is passed through the OR 54 gate to provide a clock pulse to the FIFO__CLK signal as shown in FIG. 3I. The FIFO__CLK pulse asserted causes the data on the FIFO__DIN bus to be clocked into the FIFO 50. For the next data word D1, the strobe generator 22 provides a pulse on the ACK1 signal line after detecting a falling edge 504 of the strobe signal of FIG. 3B. The data D1 corresponding to the falling edge is clocked into flip-flop 24 as shown in FIG. 3D. The ACK1 signal is then provided to the set input of the S-R latch 52 which causes the output of the latch to go to a logical high or 1. The high level output of the S-R latch 52 selects the 1 input of the multiplexer to pass the contents of register 24 to the output FIFO__DIN bus as shown in FIG. 3H. At the same time, the ACK1 signal is passed through the OR gate 54 to provide a clock pulse to the FIFO__CLK signal as shown in FIG. 3I causing the data D1 to be clocked into the FIFO 50. This process repeats itself for every edge of the H__STROBE signal until all the data is received.

The strobe generator circuit will now be described with reference to FIG. 4. The circuit includes a first group of latches 401–403 that are used to generate the ACK1 signal, and a second group of latches 404–406 that are used to generate the ACK2 signal. The 401 latch has a data input connected to an enable line (VCC/ENABLE), a falling edge triggered clock input connected to the H__STROBE signal line, a reset port connected to the output of the 403 latch, and a data output connected to the input of the 402 latch. The 402 latch has a data input connected to the data output of the 401 latch, a rising edge clock input connected to the clock signal line, a reset port connected to the output of the 403 latch, and a data output connected to the input of the 403 latch. The 403 latch has a data input connected to the data output of the 402 latch, a rising edge triggered clock input connected to the clock signal line, and a data output providing the strobe generator ACK1 line output and connected to the reset ports of the 401 and 402 latches.

The second group of latches is configured in the same manner as the first group with the exception of the first latch 404 clock input being responsive to a rising edge. The 404 latch has a data input connected to an enable line (VCC/ENABLE), a falling edge triggered clock input connected to the H__STROBE signal line, a reset port connected to the output of the 406 latch, and a data output connected to the input of the 405 latch. The 405 latch has a data input connected to the data output of the 404 latch, a rising edge clock input connected to the clock signal line, a reset port connected to the output of the 406 latch, and a data output connected to the input of the 406 latch. The 406 latch has a data input connected to the data output of the 405 latch, a rising edge triggered clock input connected to the clock signal line, and a data output providing the strobe generator ACK1 line output and connected to the reset ports of the 404 and 405 latches.

Figure 4:
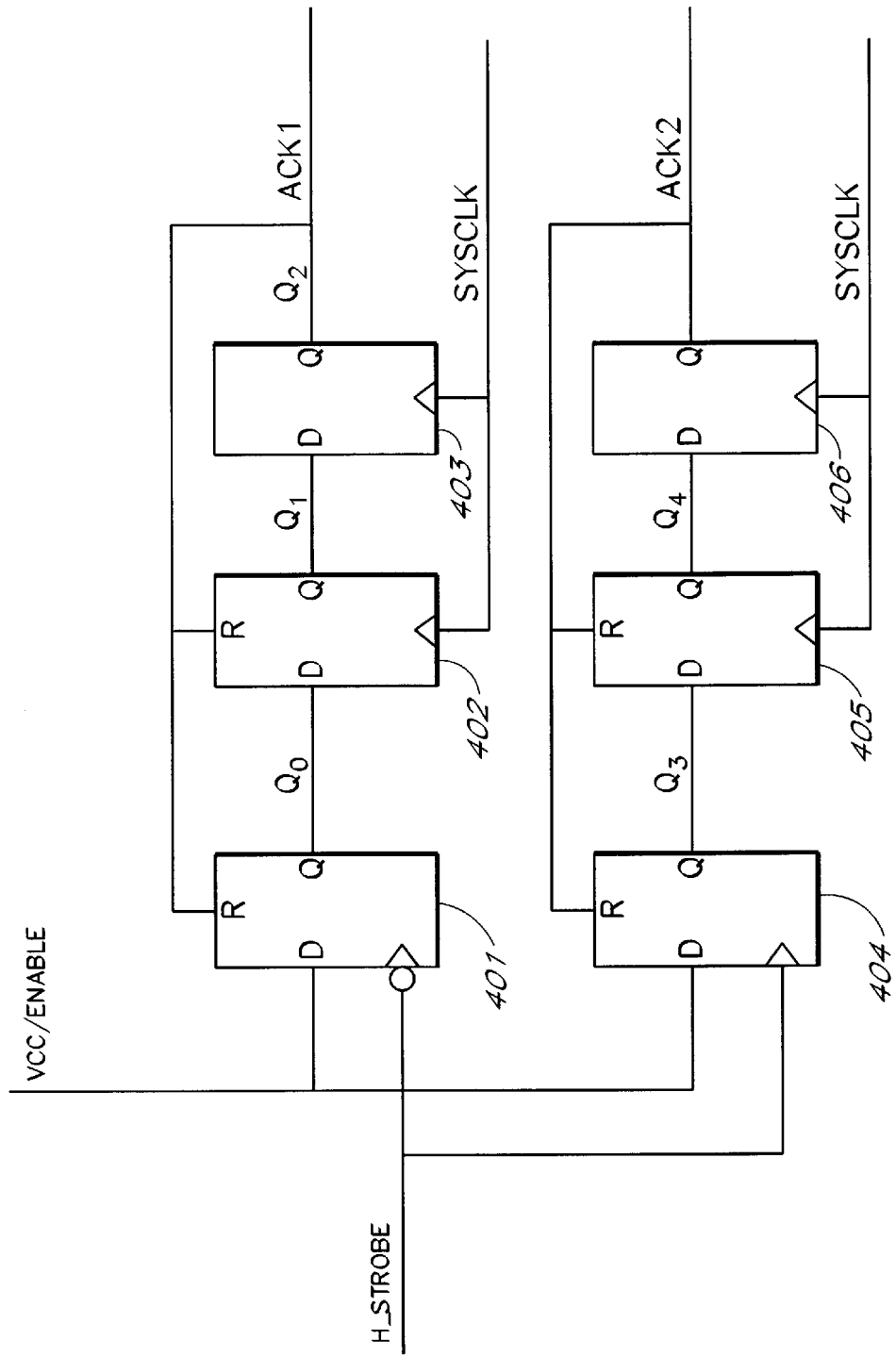
FIG. 4, is a block diagram of the strobe generator circuit included in the receiving circuit of FIG. 2.

The operation of the circuit of FIG. 4 can be better understood with reference to the signals illustrated in FIGS. 5A–5H. The H__STROBE signal transitions from a logical low to a logical high to provide a rising edge 502. The rising edge 502 causes the output of the 404 latch to change to a high logical level as is shown in FIG. 5F. The output of the 404 latch is then clocked into the 405 latch on the next rising edge of the system clock as is shown in FIG. 5G. The output of the 405 latch is clocked into the 406 latch on the next rising edge of the system clock as is shown in FIG. 5H. The output of the 406 latch then resets both latches 404 and 405 causing their output values to go to a logical low as is shown in FIGS. 5F and 5G. The output of the 405 latch is then clocked into the 406 latch on the next rising edge of the system clock to provide a low level output as is shown in FIG. 5H. Therefore a pulse is generated on the ACK2 line in response to a rising edge of the H__STROBE signal. The pulse is one clock cycle wide and is delayed by at least two clock cycles from the rising edge of the H__STROBE signal. The same set of signal propagation events occur with regards to latches 401, 402, and 403 when the H__STROBE falling edge 504 arrives. As is shown in FIGS. 5B, 5C, 5D, and 5E, a pulse is generated on the ACK1 signal line that is one clock cycle wide, at most two clock cycles after the H__STROBE falling edge arrives. Each group of latches 401, 402, 403, and 404, 405, 406 is used to generate a pulse to receive data on a single edge. By combining the two sets, strobes are generated to receive data on both edges.

From the description above it can be appreciated that dividing the strobe generation between two units, the first set of latches 401, 402, 403 and the second set of latches 404, 405, 406, provides the ability to run the system at a clock rate with a cycle length that is only one half the minimum H__STROBE width. Only two controller clock cycles need to fit within the width of the H-STROBE pulse. The advantage of the circuit of the present invention can be appreciated as the circuit of the preferred embodiment uses a 66 MHZ clock for a 30 ns H__STROBE pulse. The ability to use a slower clock is provided by the division of the pulse generation work between two distinct units. No rising edge pulses are generated in the first set of latches. No falling edge pulses are generated in the second set of latches.

The two data receiving registers provide additional important advantages to the receiving circuit. Since the data is split between the two registers of the circuit of FIG. 2, a practical data rate of ½ the input data rate is achieved to provide the receiving circuit with a greater level of data integrity. The data rate is decreased by selectively providing the data to two temporary storage units such that a data word is received into and read from a storage unit on every complete H__STROBE cycle, or every other edge of the H__STROBE signal. Data written into registers needs to be stable some time prior to and subsequent to the edge it is received on to be properly stored. Therefore, extending the time the data is available on the data line usually enhances the integrity of the data in the storage unit. By selectively passing the data to two storage units the circuit allows the data more time to settle before it has to be passed to the FIFO. The data rates within the receiving circuit can be described as a first high rate, a second lower rate, and a third higher rate. Data from the bus is coming in at a high rate, data provided to each individual register is at a lower rate (one half the bus rate), and data provided to the FIFO on the FIFO_DIN bus is again at a higher rate (substantially the bus rate).

Another important advantage provided by the separation of data into two receiving elements is that the data is on the data line for a longer period of time such that is can be more flexibly read by the FIFO. By providing the data to two temporary elements, the data is "stretched" as can be seen from a comparison of FIGS. 3C and 3H. The same data is provided on both the line of FIG. 3C and the line of FIG. 3H. The difference between the two is that one is prior to being received into the registers and the other is after reading from the registers. The data in FIG. 3H remains on the line longer and is therefore more stable than the data in FIG. 3C which allows the data to be clocked into the FIFO over a longer, more flexible, period of time.

The receiving circuit can equally be used in the host system to receive data that is read from the peripheral device. The peripheral device uses the same strobe signal and data timing when sending data over to the host system. Therefore, the receiving circuit described above can be incorporated to a chipset, or an IC on a host adapter to efficiently receive dual edge clocked data from a bus.

The receiving circuit can be used for all dual edge clocking protocols including the Ultra DMA 66 and any future increased rate protocols.

Although the invention has been described in terms of certain preferred embodiments, other embodiments that are apparent to those of ordinary skill in the art are also within the scope of this invention. Accordingly, the scope of the invention is intended to be defined by the claims that follow.

What is claimed is:

1. In a computer system in which data is transferred asynchronously on a bus between a host and a peripheral storage device on both rising and falling edges of a strobe signal, a circuit for receiving data from the bus and providing the data to an output synchronously with a local clock, the circuit comprising:

a selection signal generator which responds to rising and falling edges of the strobe signal that are not synchronized to the local clock by generating selection signals that are synchronized to the local clock;

a first data storage unit which receives and stores data transferred on the bus on rising edges of the strobe signal;

a second data storage unit which receives and stores data transferred on the bus on falling edges of the strobe signal; and a selection unit that responds to the selection signals by selecting, in an alternating manner, between the first and second storage units to provide the data synchronously to the output.

2. The receiving circuit of claim 1 wherein the receiving circuit receives data transmitted on the bus using an Ultra DMA protocol, and wherein the local clock has a frequency of substantially 66.7 MHz.

3. The receiving circuit of claim 1, wherein the receiving circuit receives data transmitted using an Ultra DMA 66 protocol.

4. The receiving circuit of claim 1, wherein the circuit is incorporated within a peripheral device controller.

5. The receiving circuit of claim 1, wherein the circuit is incorporated within a host adapter device.

6. The receiving circuit of claim 1, wherein the circuit is incorporated within a chipset in a personal computer system.

7. In a computer system in which data is transferred asynchronously on a bus between a host and a peripheral storage device on both rising and falling edges of a strobe signal, a circuit for receiving data from the bus and providing the data to an output synchronously with a local clock, wherein the local clock rate has a period that is greater than one quarter of a minimum time between rising and falling edges of the strobe signal, the circuit comprising:

a selection signal generator which responds to rising and falling edges of the strobe signal that are not synchronized to the local clock by generating selection signals that are synchronized to the local clock;

a first data storage unit which receives and stores data transferred on the bus on rising edges of the strobe signal;

a second data storage unit which receives and stores data transferred on the bus on falling edges of the strobe signal; and a selection unit that responds to the selection signals by selecting, in an alternating manner, between the first and second storage units to provide the data synchronously to the output.

8. The receiving circuit of claim 1 wherein said selection signal generator comprises:

a first set of latches that are used to generate a pulse synchronous with the local clock in response to a rising edge of said strobe signal; and a second set of latches that are used to generate a pulse synchronous with the local clock in response to a falling edge of said strobe signal.

9. The receiving circuit of claim 8 wherein said data and said strobe signal are provided in accordance with an Ultra DMA data transfer protocol.

10. A method of receiving asynchronous data from a bus on both rising and falling edges of a strobe signal and providing the data to an output synchronously with a local clock, said method comprising:

generating pulse signals synchronized to the local clock in response to rising and falling edges of the strobe signal;

passing said data to two storage units such that data arriving when a rising edge of said strobe signal is detected is passed to a first storage unit and data arriving when a falling edge of said strobe signal is detected is passed to a second storage unit; and selecting, in an alternating manner, in response to the synchronous pulses, between the first and second storage units to provide the data synchronously to the output.

11. A method of generating a pulse signal, synchronized to a local clock, in response to an edge of an asynchronous strobe signal, said method comprising:

responding to an edge of said strobe signal by passing a first logic level to a first memory unit;

storing said first logic level in a second memory unit by passing the output of said first memory unit to the input of said second memory unit in response to an edge of the local clock;

storing said first logic level in a third memory unit by passing the output of said second memory unit to the input of said third memory unit in response to an edge of the local clock;

resetting said first and said second memory units, such that a second logic level is contained therein, when said third memory unit output is at a first logic level; and storing said second logic level in said third memory unit in response to an edge of the local clock.

12. A circuit for generating pulses synchronized to a local clock in response to rising and falling edges of an asynchronous strobe signal, the circuit including a local clock signal, said circuit comprising:

a first set of latches comprising:
   a first latch used to generate a detection signal in response to a rising edge of said strobe signal; and
   at least a second and a third latch used to generate a pulse synchronous with the local clock in response to said detection signal, where an output of the third latch resets the first and the second latches but said output does not reset the third latch; and a second set of latches comprising:
   a first latch used to generate a detection signal in response to a falling edge of said strobe signal; and
   at least a second and a third latch used to generate a pulse synchronous with the local clock in response to said detection signal, where an output of the third latch resets the first and the second latches but said output does not reset the third latch.

13. A method of receiving asynchronous data from a bus, the data placed on the bus on both rising and falling edges of a strobe signal, and providing said data synchronously with a local clock to an output, said method comprising:

receiving the data into said receiving circuit at a first rate;

passing the data to a first unit in the receiving circuit at a second rate, said second rate is less than said first rate; and passing the data to the output of said receiving circuit at a third rate, wherein said third rate is greater than said second rate and said third rate is synchronized to the local clock.

* * * * *